(12) United States Patent
Ragsdale

(10) Patent No.: US 6,541,531 B2
(45) Date of Patent: Apr. 1, 2003

(54) METHOD OF INTRODUCTION OF LIQUID ADDITIVES UTILIZING AN IMPROVED DOSING ASSEMBLY

(75) Inventor: Mark E. Ragsdale, Duncan, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/992,303

(22) Filed: Nov. 19, 2001

(65) Prior Publication Data

US 2002/0055548 A1 May 9, 2002

Related U.S. Application Data

(62) Division of application No. 09/578,535, filed on May 24, 2000, now Pat. No. 6,378,734.

(51) Int. Cl.$^7$ .................................................. C08J 9/04
(52) U.S. Cl. ........................ 521/123; 521/128; 521/130; 521/170
(58) Field of Search ................................ 521/170, 130, 521/123, 128

(56) References Cited

U.S. PATENT DOCUMENTS 5,887,768 A * 3/1999 Price et al. .................. 222/486

* cited by examiner

Primary Examiner—John M. Cooney, Jr.
(74) Attorney, Agent, or Firm—Terry T. Moyer; William S. Parks

(57) ABSTRACT

This invention relates to an improved dosing assembly (valve/feed line/liquid collecting vessel) which permits nearly immediate response time to an actuator signal. Such an assembly is used for the controlled introduction of any liquid through a valve into a collecting vessel. In particular, the inventive assembly exhibits substantially no leakage from the feed line into the liquid collecting vessel when the valve is closed and an instantaneous introduction of the feed line liquid into the liquid collecting vessel upon opening of the valve, both when a liquid possessing a surface tension of about 50 dynes/cm$^2$ is used as the measurement standard. This assembly is particularly and preferably suited for injecting colorants into reactants for the production of polyurethane slabstock foam and permits a substantial reduction in foam waste due to low colorations during an on/off cycle. Preferably, this inventive assembly comprises a ball valve, a manifold, and a connector pipe which may contain at most 30 mL of liquid at any single moment and which is measured in diameter of at most 0.42 inches (about 1.07 cm). Such a connecting pipe permits substantially instantaneous shut-off and -on without appreciable leakage or pressure drop and without the need to utilize a high throughput flow rate. Also, such a specific connecting pipe is wide enough to permit high through-put rates should the need arise. The valve/pipe/manifold configuration is contemplated within this invention.

9 Claims, 3 Drawing Sheets

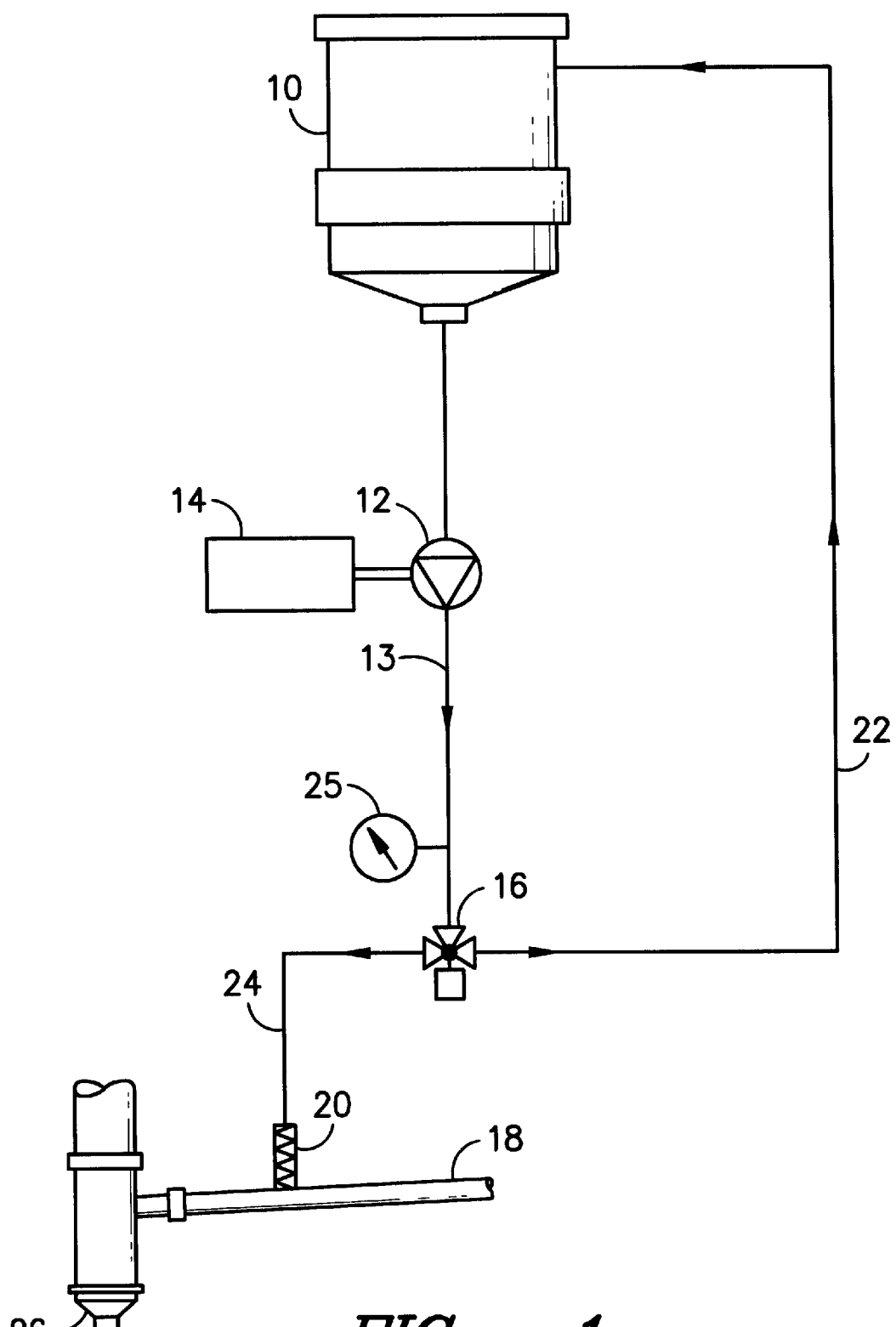
FIG. -1-
PRIOR ART

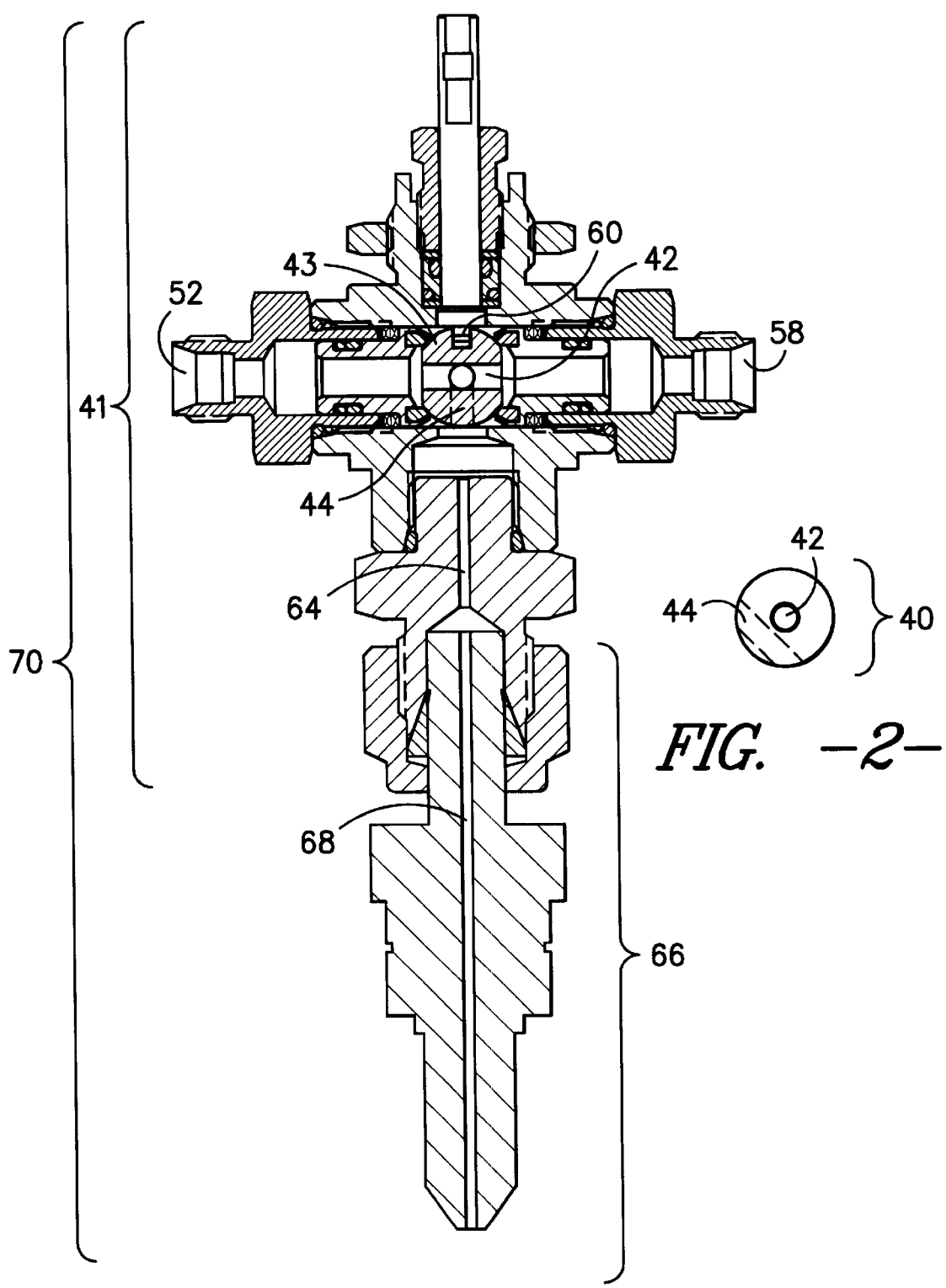
FIG. -2-
FIG. -3-

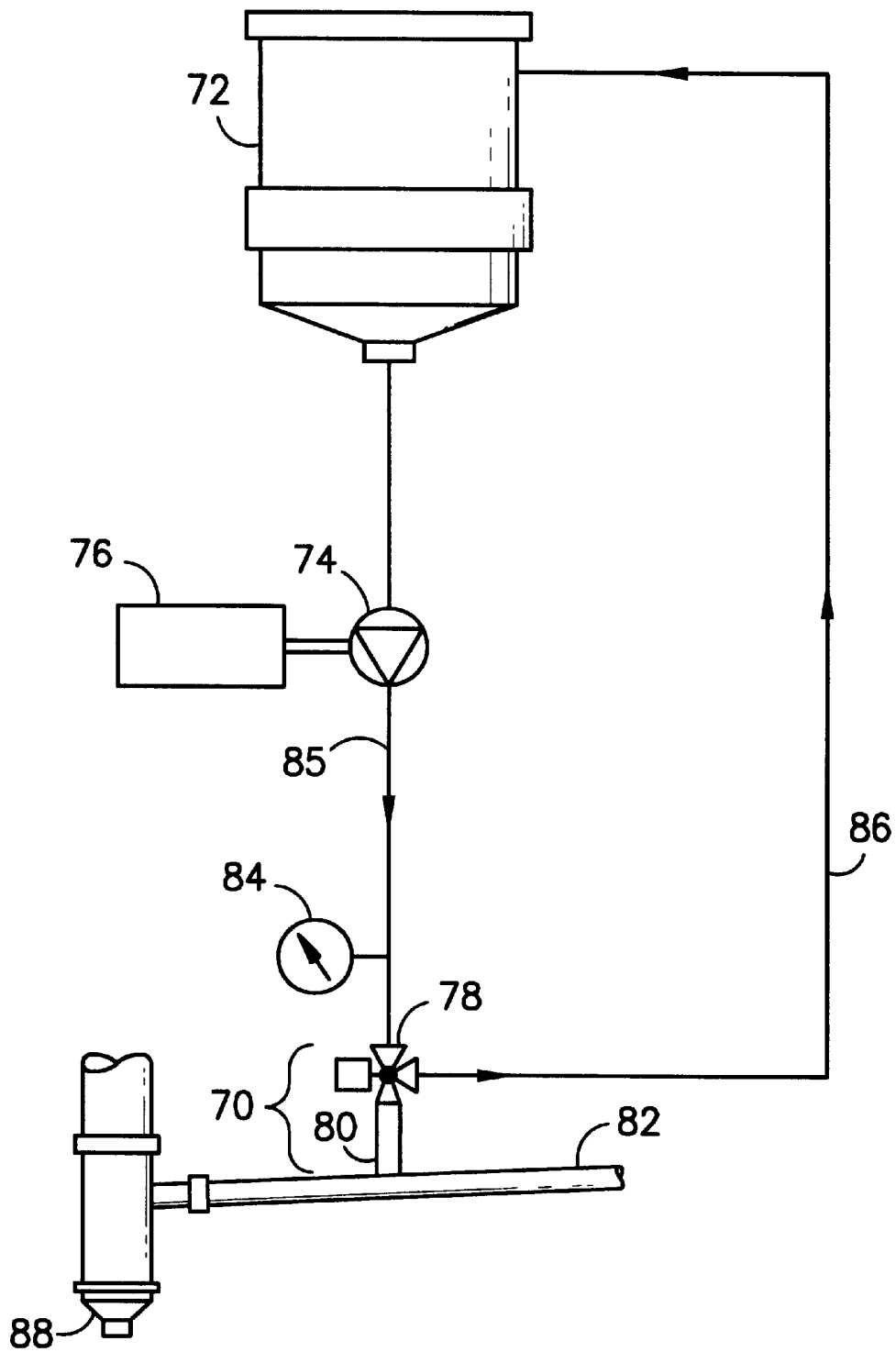
FIG. —4—

METHOD OF INTRODUCTION OF LIQUID ADDITIVES UTILIZING AN IMPROVED DOSING ASSEMBLY

CROSS REFERENCE TO RELATED APPLICATIONS

This application is a divisional of application Ser. No. 09/578,535, filed on May 24, 2000, now U.S. Pat. No. 6,378,734. This parent application is herein entirely incorporated by reference.

FIELD OF THE INVENTION

This invention relates to an improved dosing assembly (valve/feed line/liquid collecting vessel) which permits nearly immediate response time to an actuator signal. Such an assembly is used for the controlled introduction of any liquid through a valve into a collecting vessel. In particular, the inventive assembly exhibits substantially no leakage from the feed line into the liquid collecting vessel when the valve is closed and an instantaneous introduction of the feed line liquid into the liquid collecting vessel upon opening of the valve, both when a liquid possessing a surface tension of about 50 dynes/cm² is used as the measurement standard. This assembly is particularly and preferably suited for injecting colorants into reactants for the production of polyurethane slabstock foam and permits a substantial reduction in foam waste due to low colorations during an on/off cycle. Preferably, this inventive assembly comprises a ball valve, a manifold, and a connector pipe which may contain at most 30 mL of liquid at any single moment and which is measured in diameter of at most 0.42 inches (about 1.07 cm). Such a connecting pipe permits substantially instantaneous shut-off and -on without appreciable leakage or pressure drop and without the need to utilize a high throughput flow rate. Also, such a specific connecting pipe is wide enough to permit high through-put rates should the need arise. The valve/pipe/manifold configuration is contemplated within this invention.

BACKGROUND OF THE INVENTION

The demand for a wide variety of colors in polyurethane slabstock foam has resulted in a significant move to blend-on-fly color dosing units based on the use of polymeric colorants. In this case color metering equipment is used to accurately dose two or more colors that are injected into the polyol stream and subsequently mixed in the foam mixhead to provide the correct shade and depth of color. The biggest advantage of this type of approach is that now an unlimited number of colors can be made from 4 or 5 "primary" colors. In addition, changes from one dark color to the next can usually be accomplished in relatively short distances minimizing the amount of foam that must be scrapped as a result of the color change. Light shades have proven to be more of a challenge since the color throughput is substantially lower causing the response time to increase before changes actually made in the system can take effect. A means was needed to reduce this response time to an acceptable level thus minimizing the length of time required to change from one color to the next even at flow rates (approaching 2 grams per minute or less.) To do this it was necessary to design a unique 3-way valve/injector system that minimized the volume between the injection port and the recirculation line. This results in a rapid build up of pressure and hence almost instantaneous feed when switching from recirculation to dispense mode. In addition to rapid initiation of color flow it also required that flow be almost instantaneously interrupted even at high throughput when the color was switched from dispensing mode back to the recirculation mode. This is to prevent the "bleeding" of color back into the manifold when the need for color ends. The near immediate start and stop of color flow has been accomplished as a result of the current invention.

Polymeric colorants (i.e., polyoxyalkylenated colorants) such as those described in U.S. Pat. No. 4,284,279 to Cross et al., herein entirely incorporated by reference, have been used for a number of years to color polyurethane slabstock foam (i.e., in a continuous process). Prior to the utilization of such polymeric colorants, pigment dispersions were the main source of polyurethane coloring compounds. Such dispersions have traditionally proven very difficult to handle, too viscous for use within standard injectors, highly staining and thus difficult to clean from standard injector equipment (without the need for environmentally unfriendly solvents), and very abrasive and thus potentially damaging to the delicate machinery associated with coloring slabstock polyurethane foam. As a result, polymeric colorants are widely accepted as the best materials for coloring polyurethane foam.

In the past, custom blends of polymeric colorants were made ahead of time using two or more "primary" colors prior to incorporation within the target foam. The components would be mixed together using some typed of agitation such as mixer or drum tumbler. Once the blend was of an appropriate shade it was transferred to a storage tank for further introduction within the foam substrate. Upon completion of coloring with a specific batch of polymeric colorant, the previously run color would have to be emptied from the storage tank; the tank would need to be cleaned; and then the next color to be run in the same tank would have to be charged in the tank. Cleaning of the tanks, pipelines, etc., was facilitated due to the water-solubility of the polymeric colorants (particularly as compared to pigments); however, the procedures followed were still considered labor intensive and not cost efficient. The general practice was then modified to maintain a dedicated tank for each separate color (shade) that was to run. This led to a number of inefficiencies and limitations that were not desirable if a foam manufacturer was to adequately meet demands in the market place.

Polymeric colorants such as those cited above in Cross et al. were designed to be totally miscible with one another as well as with most polyols, one of the two main ingredients used to produce polyurethane materials (isocyanates being the other). Pigment dispersions, on the other hand, are particulates dispersed in some type of liquid carrier. They require a high degree of agitation before they satisfactorily blend together to provide a uniform color. As a result the short amount of time that the polyol and colorant are mixed in the typical slabstock foam machine's mixhead may not be sufficient to produce an adequate mixture of components to insure a single, homogeneous coloration throughout the target foam. Thus, another modification was made permitting separate addition of desired polymeric colorants within a polyol manifold for subsequent blending as the polyol/isocyanate mixture passes through the mixhead. As a result, well over half of all the colored slabstock foam is produced in the United States through such a method.

A configuration of this "new" (now typical) on-the-fly colorant production line for slabstock foam is depicted in FIG. 1. This new coloring system itself generally consisted of 4 to 6 "primary" color storage tanks (one of which is depicted as 10 in FIG. 1) each feeding color to at least one positive displacement spur gear pump 12 coupled to a variable speed motor/drive 14 (such as available from Viking). The motor/pump combination 12, 14 was typically run continuously in either recirculation or dispense mode (depending on the position of a 3-way valve 16) to minimize the time required to spool up the motor 14 to the proper rpm and to ultimately achieve the pressure required to initiate color flow into a pre-mix manifold 18 through an injector 20. The throughput pressure was typically measured through the utilization of a pressure gauge 25 attached to the feed line 13 from the pump 12 to the 3-way valve 16. The typical 3-way valve 16 was air actuated and used to direct the flow of colorant from the recirculation feed line 22 to the dispense feed line 24 (to the injector 20) when color flow to the manifold 18 was required. From the manifold 18, the colorant(s) was moved to the mixing head 26 and then further on to color the target slabstock foam (not illustrated). Although this configuration has proven effective in the past, there remain a number of problems associated with this procedure which have heretofore been unresolved. Most importantly, it has been found that although the injector 20 was intended to prevent leakage of unwanted colorant into the manifold, such a device actually appears to permit an appreciable amount of such undesirable colorants to enter the manifold even when the valve itself is closed. Such a problem has been compounded with other detrimental effects present with such a device.

For instance, the market place demands that a foam producer be able to provide dark shades as well as light shades with a variety of hues and polyol flow rates. Since color is metered volumetrically a wide range of color flow rates are required to insure low enough flow for a minor component in a light shade. In addition, the polyol flow rates can be as low as 10 kg/min and as high as 300 kg/min [color loading is generally stated in parts per hundred polyol (php)]. As the rate at which the polyol flows is reduced so must the color rate be reduced to maintain the same php. For most foam manufacturing plants in the United States and elsewhere the color delivery systems must be able to provide color flow as low as 2 grams/min and as high as 7000 grams/min or more. The rate at which color begins to flow when pumping 5000 grams/minute is generally very different than pumping 5 grams/min until the present invention is incorporated. Prior to this point the general approach was to use a smaller diameter line for the low flow range. Unfortunately, there are distinct limitations on such a small diameter (small bore) feed line, most notably the resultant throughput pressure drop from pumping material several feet through a small diameter line. Also, the typical dosing system does not permit an instantaneous shutoff without continued introduction of colorant into the manifold. This is apparently due to the large volume of colorant present within the feed line between the valve to the manifold. During dosing, the colorant continues to move through the feed line until it reaches the manifold and then, hopefully, mixes evenly and thoroughly within the polyol component. Upon shutoff, the colorant stops moving into the feed line; however, there is a certain amount remaining within the feed line which continues to move through unevenly. The polyol would thus be discolored or colored unevenly (which thus produces waste foam) itself upon introduction of the residual feed line colorant.

An entire colorant dosing (pumping) system (such as discussed with regard to FIG. 1, above) was developed to evaluate a variety of injection systems that closely resembles an actual production unit. It consisted of a spur gear pump from Viking coupled with a full flux vector motor and drive from Baldor. Stainless steel tubing having an outside diameter of ¼ inch was connected to the discharge side of the pump. The distance from the pump to the 3-way valve was approximately 40 feet. The distance from the standard 3-way valve to the check valve (injector) Was 3 feet; the diameter of this feed line was about 0.25 inches; and the available liquid volume within the feed line was about 30 mL. The motor/pump was run to insure pressure up through the 3 way valve and it was allowed to dispense to insure that fluid filled the line under pressure from the check valve. Measurements were then taken of the time required from the moment the 3 way valve is switched from recirculation to dispense and the time that a liquid polymeric colorant actually began to flow at various throughputs. Colorant response time (the time required for colorant to begin to flow from the three-way valve to the injector) compared with throughput flow rate for this well known system. The results are tabulated below for a liquid polyol exhibiting a surface tension of about 50 dynes/cm$^2$ (Fomrez® 11225, available from Witco).

TABLE 1

| Colorant Response Time (seconds) | Flow Rate (g/min) |
|---|---|
| 48 | 2.5 |
| 15 | 4 |
| 5 | 20 |
| 3 | 42 |
| 0 | 86 |

Thus, at low throughput flow rate, the time before delivery becomes excessive. It initially took 48 seconds from the time the valve was rotated until color began to flow at 2.5 grams per minute. This would represent almost 17 feet of off-quality foam generated with the conveyor speed of 22 feet per minute or a loss of up to 700 lbs of waste foam that would require disposal. Obviously, an instantaneous delivery was needed for all flow rates which has not been accorded the industry by the prior art. Furthermore, even after shutoff the feed line continued to introduce drops of colorant within the manifold; thus, the amount of discolored, waste foam was even greater after shutoff of the dosing system. Thus, an improved dosing system is necessary to best ensure thorough coloring at high or low throughput pressures and to reduce the production of waste foam.

DESCRIPTION OF THE INVENTION

It is thus an object of the invention to provide a specific valve/manifold assembly which permits very low volumes of liquid to be transported from the valve to the manifold in order to minimize the amount of liquid leakage into the manifold upon closing of the valve. Another object of this invention is to provide a low-volume feed line connector for a valve dosing system which exhibits retention of substantially all dosed liquid present within the feed line after shutoff of the valve. Another object of this invention is to provide an apparatus for specifically coloring polyurethane slabstock foam which comprises a unitary valve/feed line/manifold assembly wherein the feed line exhibits substantially no leakage of colorant into the manifold upon valve shutoff due to capillary action, adhesion, and/or cohesion effects. A further object of the invention is to provide a low throughput flow rate method of coloring polyurethane slabstock foam with a colorant injection which substantially reduces and possibly eliminates the production of off-quality, improperly colored waste foam materials.

Accordingly, this invention encompasses a liquid dosing assembly comprising a valve, a feed line, and a liquid collecting vessel; wherein said feed line acts as a transport conduit between said valve and said liquid collecting vessel; wherein said liquid dosing assembly exhibits substantially no leakage of a liquid from the feed line into the liquid collecting vessel when said valve is oriented in the closed position; wherein substantially all of said liquid is retained within said feed line at the moment said valve is oriented in the closed position; and, wherein upon reorientation of said valve from the closed to the open position, said liquid instantaneously moves into the liquid collecting vessel. Also, such an invention more specifically concerns a liquid dosing assembly comprising a valve, a feed line, and a liquid collecting vessel, wherein said feed line acts as a transport conduit between said valve and said feed line, and wherein, upon introduction of a liquid possessing a surface tension of 50 dynes/cm$^2$ into said dosing assembly, said liquid exhibits substantially no leakage from the feed line into the liquid collecting vessel when the valve is closed and instantaneous movement into the liquid collecting vessel upon opening of the valve. Further contemplated within this invention is a liquid dosing assembly comprising a valve, a feed line, and a liquid collecting vessel, wherein said feed line simultaneously connects to said valve and feeds into said liquid collecting vessel, and wherein said feed line exhibits a liquid storage capacity of at most 30 mL, and exhibits a diameter of at most 0.42 inches (1.07 cm). This invention also encompasses particular slabstock foam coloring procedures utilizing such a dosing assembly.

Such an inventive dosing assembly thus includes any configuration which prevents leakage of a liquid to the collecting vessel and allows for instantaneous response time in relation to valve opening to quickly transport the liquid into the collecting vessel. Alternatively, another embodiment of the inventive assembly necessarily exhibits the same capabilities but for at least a liquid possessing a certain surface tension. It is to be understood in such an instance that the liquid surface tension constant (50 dynes/cm$^2$) is not a limitation of the only liquid to be utilized within this inventive assembly, but merely a standard liquid surface tension for which the inventive valve assembly must always function properly. Thus, even if the liquid introduced within the assembly possesses a much lower surface tension (i.e., 10 dynes/cm$^2$), as long as the aforementioned functional characteristics are met (i.e., substantially no leakage when the valve is closed and instantaneous movement into the collecting vessel when the valve is open) in relation to an introduced liquid possessing the standard 50 dynes/cm$^2$ surface tension, the invention is met. In fact, the "liquid" utilized within the inventive assembly may be a pigment dispersion, or the like, which comprises an appreciable solids content. Again, such dispersions, etc., may be utilized within the inventive assembly; the assembly must only exhibit the specific functional characteristics upon introduction of a standard surface tension liquid.

The term "liquid collecting vessel" is intended to encompass any possible vessel into which the liquid transported through the valve and feed line may be stored, either temporarily or permanently. Thus, this term may, as merely a few examples, encompass, a manifold pipe, a storage container, including, again, as merely examples, a storage tank (either immobile or mobile; i.e., a ground tank or vehicle tank), and the like. Therefore, any liquid may be transported through utilization of the inventive dosing assembly, including, organic liquids, such as, without limitation, colorants, dyes, alcohols, fuels, and the like; inorganic liquids, such as, peroxides, water, and the like. The term "slabstock polyurethane foam" is a well known description of cured polyurethane foam, made from the reaction of polyols and isocyanates. In addition to polyols and isocyanates, other components are added to such foam products in relatively low proportions, such as, without limitations, surfactants, catalysts, flame retardants, blowing agents, and the like. Although providing polyurethane foam colorations are a primary objective of this inventive dosing assembly, these other additives may also be introduced within polyurethane slabstock foam (as well as many other end-use products) with this particular device. The inventive assembly beneficially and surprisingly permits controlled dosage of any liquid (or dispersed) additives at a selected rate and in a selected amount. This benefit is of utmost importance within many industries, particularly the polyurethane slabstock foam manufacturing market, since controlled addition of colorants, catalysts, surfactants, etc., have been of great necessity, but nearly impossible to attain with previously used dosing apparati. As such, the inventive dosing assembly provides the ability to control dosage at any preselected time or level or proportions within a target composition within the liquid collecting vessel portion of the inventive assembly.

The term "valve" encompasses any device which may be rotated or moved in some fashion to restrict or prevent the flow of liquid into the feed line after shut-off. This term is intended to encompass any three-way type valve, including, without limitation, ball valves, plunger valves, rotating valves, and the like. Such a term is also intended to encompass an individual assembly comprising such a specific valve but which may include a pipe or channel of some type leading into the feed line component of the inventive dosing assembly. The term "feed line" is intended to mean a connecting pipe (preferably cylindrical, or at least, substantially cylindrical, in shape) between the valve and liquid collecting vessel. The feed line must connect simultaneously to both the valve and the liquid collecting assembly in such a fashion as to permit one-way movement of any liquid introduced within the dosing assembly from the valve component to the collecting vessel (or vice-versa, possibly).

The term "substantially no leakage" as it pertains to the functional characteristics of the inventive dosing assembly simply describes the extremely low amount of liquid which may move out of the feed line into the collecting vessel once the valve is closed. This leakage of only low amount of moved liquids is accomplished through the vacuum seal provided by the closed valve supplemented with the cohesion of the liquid and adhesion of the liquid to the feed line walls (both through capillary action). In the past, injectors (such as spring-loaded or plunger types) and/or check valves (such as spring-loaded and/or plunger types) were present within feed lines leading from a valve to a liquid collecting vessel. Such injectors and/or check valves have proven to be very troublesome to use, particularly in low throughput pressure applications, due to the leakability of liquids accumulating at metal—metal separatable interfaces. In the inventive assembly, no spring-loaded injectors or check valves are utilized; only vacuum sealing and capillary action provide the necessary suction to retain substantially all of the introduced liquid within the feed line. Thus, the term "substantially" in this instance requires that all but a few drops of liquid must be retained; this amount should aggregately add up to no more than about 5% of the total storage capacity of the feed line after about 1 hour of valve closure; preferably, this amount is no more than about 1%, more preferably no more than about 0.1%, and, of course, most preferably no liquid leakage occurs after such a period of time. As such, the feed line must retain all but the same amount of liquid permitted to leak from the feed line into the liquid collecting vessel after valve closure. Upon closure then, the liquid present within the feed line must remain there through vacuum sealing provided by the closed valve and the capillary action (adhesion and cohesion) provided by the liquid in contact with the feed line inner surface. This liquid retention within the feed line (and correlative non-leaking characteristic from the feed line into the collecting vessel after 1 hour of valve closure) is of utmost importance, since, specifically within colored slabstock polyurethane foam production methods, any unwanted colorant introduced within the mixing manifold will discolor the target foam product. With other additives which may be introduced within such foaming methods, the ability to control the dosing through extremely reduced leakage from the feed line into the collecting vessel thus allows for the desired controlled dosage noted above.

Alternatively, the inventive dosing assembly may be defined in terms of the storage capacity volume and orifice size of the feed line alone. Such characteristics contribute to the desired capillary action necessary to effectuate the non-leakage benefits in tandem with the vacuum seal of the closed valve. Thus, a 30 mL storage capacity coupled with an orifice size (feed line diameter) of at most 0.42 inches, should provide the desired functions (i.e., non-leakage and instantaneous response time). Preferably, the storage capacity is about 1 mL and the diameter is at most 0.33 inches; more preferably, these are about 5 mL and 0.25 inches, respectively; most preferably, about 4 mL and 0.187 inches, respectively; also preferable is a low throughput pressure system comprising the inventive assembly exhibiting a feed line storage capacity of as low as about 1 mL and an orifice size (diameter) of about 0.078 inches.

As noted above, the instant invention solves the problems associated with prior dosing assemblies, particularly for, but not limited to, slabstock polyurethane foam production lines. The special low-volume feed line was developed to best ensure prevention of leakage from the feed line to the liquid collecting vessel upon shut-off of the valve. The seal pressure of the valve, coupled with the capillary action, adhesion, and/or cohesion of the liquid to the feed line walls or to itself, provides an extremely reliable dosing assembly from a leakage standpoint. This is highly desirable, particularly where the liquid collecting vessel is intended to be kept clear of dosed liquid at selected times. The feed line itself is preferably connected simultaneously to both the valve and the liquid collecting vessel (in order to transport a liquid through the valve and feed line into the vessel itself); however, if desired or necessary, the feed line may only lead into the liquid collecting vessel; a connection with such a component is not required. The only limitations concerning the feed line pertain to the available volume and the maximum diameter; generally, any length of feed line may be utilized as long as the volume and diameter requirements are not exceeded.

This dosing assembly was tested in a similar manner as the standard configuration in FIG. 1. The results exhibited instantaneous flow regardless of the flow rate. Furthermore, after valve shut-off, there was no visible introduction of colorant into the polyol component. Such a new assembly thus provides a significant improvement over the current state of the art. For polyurethane slabstock foam, the virtual elimination of waste foam is of utmost importance (thereby reducing costs to the end user and reducing the amount of environmentally unfriendly off-quality polyurethane foam entering landfills, and the like).

The valve itself may comprise, as noted above, any standard shut-off and -on device. However, particularly preferred are 3-way ball valve configurations which permit more reliable shut-off and -on. Any 3-way ball valve may thus be utilized in this invention. One preferred ball valve is taught within U.S. patent application Ser. No. 09/259,114 to Ragsdale et al. Such a specific ball valve (which is a spherical ball valve) configuration facilitates an instantaneous on/off switching between a dispensing feed line to an injector unit and a feed line to a recirculation assembly (to reduce the amount of colorant potentially wasted and to best insure the throughput pressure of the entire apparatus remains uniform at all times). In particular, this preferred ball valve comprises two exclusive channels, one of which is positioned to direct the flow of colorant to the recirculation assembly and the other to direct such a flow to the injector. This is accomplished by having the two separate channels be aligned on totally separate axes (for instance, one on the x-axis and the other aligned on the yz-axis). More specifically, the channel not on the x-axis must enter the spherical ball valve at a point referenced as 0° on the particular axis and exits the spherical ball valve at a point 90° on the same axis. In this manner, the two channels are completely exclusive of each other, thereby facilitating movement of the valve between recirculation and dispensing modes. Furthermore, the configuration of the non-x-axis channel reduces the change of pressure on the liquid colorant through the valve than with a standard right angle bending channel (it provides a sort of shunt). Such a ball valve has proven to be invaluable in providing the necessary instantaneous on/off (color response) times as well as maintaining the proper flow rate (at an extremely wide range from about 0.3 g/min to about 14,000 g/min).

An actuator is utilized, generally, to rotate this ball valve into these specific positions. Such an actuator includes a pin extending into the valve assembly, the end of which pin is shaped to fit an indentation in the ball valve. The actuator then turns the ball valve the requisite number of degrees to align the respective channel to the desired feed line (90° is preferred, although, in some instances, 180° may be possible).

The only other manners of reducing waste slabstock foam have resorted to the utilization of relatively high pressures or flow rates. For instance, color variations in the resultant foam products occur with regularity in the standard coloring assemblies when the pressure between the pump and the three-way valve is significantly increased in order to reduce colorant response time (the time required to move the colorant from the three-way valve to the manifold). This is caused by pressure differences between the area between the pump and the valve and the valve and the manifold and the fact that polymeric colorants exhibit slight degrees of compressibility which are not properly accounted for in the standard slabstock foam coloring assemblies. Since such colorants may be transported to the valve at an abnormally high flow rate to the injector (while the dispense feed line has not been in use and thus may exhibit a lower amount of pressure), the overall colorant flow rate may oscillate to an abnormally low rate (to compensate for the pressure existing between the valve and the manifold) prior to its ultimate stabilization. This may require several seconds (i.e., less than 1 minute, more likely about 30 seconds)minutes of stabilization time which, again, may result in waste off-quality foam product. Furthermore, waste (off-quality) foam production has been attributed to delayed colorant flow (throughput flow rate), pressure drop, and turbulence problems, which themselves are caused by varying bore sizes between the three-way valve, the colorant dispensing feed line (to the injector), and the injector within standard polyurethane slabstock foam coloring apparati. Preferably, the inventive dosing assembly exhibits substantially the same bore size through the valve and the feed line to compensate for any such problems. Such similar bore sizes are preferred within the inventive assembly; however, such similarities are not totally required because the feed line limitations also compensate for such problems and have proven effective without the necessity of restricting bore size variations. Furthermore, the feed line may be tapered at the end leading to the collecting vessel in order to aid in the restriction of leaking liquid. However, such tapering alone will not function to stop the undesirable leakage or provide the instantaneous response time without the same capillary action and vacuum sealing provided by the inventive assembly. Thus, the invention permits a substantial reduction (almost total elimination) of waste foam upon the utilization of very low, but highly desirable, flow rates and also allows for the utilization of an extremely wide range of flow rates without an appreciable pressure drop through the entire apparatus.

BRIEF DESCRIPTION OF THE DRAWINGS

FIG. 2 is a cross-section of the preferred spherical ball valve utilized within the inventive dosing assembly.

FIG. 3 is a schematic cross section of the preferred dosing assembly for a slabstock foam coloring procedure.

FIG. 4 is a diagram of the preferred coloring procedure utilizing the preferred dosing assembly.

DETAILED DESCRIPTION OF THE DRAWINGS INCLUDING PREFERRED EMBODIMENTS

The spherical ball valve 40 of FIG. 2, which may be made from stainless steel (preferably), titanium, carbon steel, and the like, comprises a first channel 42 which runs through the entire sphere on one single axis (the x-axis, for instance) and at a specific angle (such that the entire channel 42 is located at 0° on the x-axis). The ball valve 40 also comprises a second channel 44 which runs through the entire sphere on one single axis exclusive of the first channel 42 (here the y-axis although the z-axis is also possible) and at a specific angle (such that the channel 44 enters the ball valve 40 at a point at approximately 0° on the sphere in the y-axis and exits the ball valve 40 at a point 90° from the other entry but still in the same axis. Through this configuration, the first channel 42 permits flow of the liquid colorant (not illustrated) through the valve 40 to a recirculation feed line (58 of FIG. 3) when aligned with the inlet feed line (52 of FIG. 3) from a storage tank (72 of FIG. 4). Upon rotation of 90° by the utilization of a actuator pin (60 of FIG. 3) attached to an actuator (62 of FIG. 3) engaged with a properly shaped indentation (not illustrated) located at the point 270° on the y-axis in and of the ball valve 40, the first channel 42 is disengaged from all of its corresponding feed lines (52, 58 of FIG. 3) and permits the flow of liquid colorant (such as polymeric colorants, not illustrated) through the ball valve 40 (43 of FIG. 3), through an attached pipe (64 of FIG. 3) and into the collecting vessel (dispensing) feed line (68 of FIG. 3). The bore of each channel 42, 44 is the same for each; however, the actual size of both bores in said channels 42, 44 may be of any size as long as they are preferably the same size as the bore of the inlet feed line (52 of FIG. 3), the recirculation feed line (58 of FIG. 3), the attached pipe (64 of FIG. 3), and the dispensing feed line (64 of FIG. 4). The ball valve 40 (43 of FIG. 3) size is merely dependent upon the amount of space between all of the feed lines (52, 58, 64 of FIG. 3) within the entire valve assembly (41 of FIG. 4). The dispensing feed line (68 of FIG. 3) permits the flow of the liquid colorant (not illustrated) into the manifold (82 of FIG. 4). The dispensing feed line (68 of FIG. 3) may be preferably attached to the valve assembly 41 by way of a screw mechanism (not illustrated), although any other means, such as welds, snaps, pins, and the like, may also be utilized for such a purpose. The dispensing feed line (66 of FIG. 3) in this instance exhibits a storage capacity volume of about 4 mL and an orifice size (diameter) of about 0.187 inches.

FIG. 4 thus incorporates the preferred dosing assembly (70 of FIG. 3) into the entire slabstock foam coloring apparatus and procedure. The colorant is transported from a storage tank 72 to at least one positive displacement spur gear pump 74 coupled to a variable speed motor/drive 76 (such as available from Viking). The motor/pump combination 74, 76 is run continuously in either recirculation or dispense mode (depending on the position of the 3-way valve 78). In dispense mode, the colorant flows through the injector 80 into a pre-mix manifold 82. The throughput pressure is measured through the utilization of a pressure gauge 84 attached to the feed line 85 from the pump 74 to the 3-way valve 78. The 3-way valve 78 is air actuated (although any other type of actuator may be used) and and directs the flow of colorant from the recirculation feed line 86 to the dispense feed line 80) when color flow to the manifold 82 is desired. From the manifold 82, the colorant is moved to a mixing head 88 and then further on to color the target slabstock foam (not illustrated). Upon orientation of the valve 78 into its closed position, and with a dispense feed line 80, exhibiting a volume of about 27.2 mL and a pipe diameter of about 0.42 inches (with a length of about 1 foot), dispensing of a 50 dynes/cm$^2$ colorant (in this instance REACTINT® Blue X17, available from Milliken & Company) stops immediately from the dispensing feed line to the manifold 82; even after 1 hour of closure of the valve 78, there is no noticeable leakage of the colorant from the feed line to the manifold 82. Upon rotation of the ball valve 78 to its open position, the colorant instantaneously (i.e., within 1 second, preferably within 0.5 second, and most preferably within 0.1 second) enters the manifold 82 and begins to mix with the polyol. Altering the size of the feed line in both volume and diameter resulted in the following measurements, presented in tabular form with a pass rating symbolizing substantially no leakage after 1 hour of valve closure and instantaneous movement of the liquid into the manifold through the feed line after opening of the valve. A fail rating symbolizes leakage, too long response time, or both. The results were as follows for the high surface tension liquid colorant (A) and a lower surface tension liquid colorant (B; REACTINT® Yellow X15, available from Milliken & Company)(about 37 dynes/cm$^2$):

TABLE 2

| Liquid | Feed Line Diameter (in) | Feed Line Volume (mL) | Rating |
|---|---|---|---|
| A | 0.078 | ~1 mL | Pass |
| A | 0.0815 | 1.025 | Pass |
| A | 0.148 | 3.381 | Pass |
| A | 0.187 | 5.398 | Pass |
| A | 0.271 | 11.337 | Pass |
| A | 0.325 | 16.305 | Pass |
| A | 0.348 | 18.694 | Pass |
| A | 0.376 | 21.823 | Pass |
| B | 0.078 | ~1 mL | Pass |

TABLE 2-continued

| Liquid | Feed Line Diameter (in) | Feed Line Volume (mL) | Rating |
|---|---|---|---|
| B | 0.0815 | 1.025 | Pass |
| B | 0.148 | 3.381 | Pass |
| B | 0.187 | 5.398 | Pass |
| B | 0.271 | 11.337 | Pass |
| B | 0.325 | 16.305 | Pass |
| B | 0.348 | 18.694 | Pass |
| B | 0.376 | 21.823 | Pass |
| B | 0.420 | 27.23 | Fail |

Thus, the breadth of available diameters and volumes though small is still substantial.

The actual orientation of the assembly is immaterial as to its functioning properly as desired. Thus, the assembly may be oriented on its horizontally, vertically (either upside down or, preferably right side up), and at any angle in relation to the system in which it is integrated.

There are, of course, many alternative embodiments and modifications of the present invention which are intended to be included within the spirit and scope of the following claims.

What we claim is:

1. A method of controlled introduction of additives within a polyurethane slabstock foam producing system utilizing a liquid dosing assembly comprising a ball valve, a feed line, and a liquid collecting vessel; wherein said feed line acts as a transport conduit between said ball valve and said liquid collecting vessel; wherein, said liquid dosing assembly exhibits substantially no leakage of a liquid from the feed line into the liquid collecting vessel when said ball valve is oriented in the closed position, substantially all of said liquid is retained within said feed line at the moment said ball valve is oriented in the closed position, and, upon reorientation of said ball valve from the closed to the open position, said liquid instantaneously moves into the liquid collecting vessel; said method comprising the steps of
(a) providing a liquid polyol within said collecting vessel;
(b) introducing at least one liquid additive from the group consisting of at least one dye, at least one pigment, at least one polymeric colorant, at least one catalyst, at least one surfactant, at least one flame retardant, water, and any mixtures thereof, into said collecting vessel through said feed line to form a resultant mixture of said liquid polyol and said at least one liquid additive.

2. The method of claim 1 wherein said ball valve is a 3-way ball valve comprising at least one channel.

3. A method of controlled introduction of additives within a polyurethane slabstock foam producing system utilizing a liquid dosing assembly comprising a ball valve, a feed line, and a liquid collecting vessel, wherein said feed line acts as a transport conduit between said valve and said feed line, and wherein, upon introduction of a liquid possessing a surface tension of about 50 dynes/cm$^2$ into said dosing assembly, substantially all of said liquid present within said feed line at the moment said valve is oriented in the closed position is retained within said feed line resulting in substantially no leakage of said liquid from said feed line into said liquid collecting vessel when said valve is oriented in the closed position and said liquid instantaneously moves into said liquid collecting vessel upon reorientation of said valve from the closed to the open position; said method comprising the steps of
(a) providing a liquid polyol within said collecting vessel;
(b) introducing at least one liquid additive from the group consisting of at least one dye, at least one pigment, at least one polymeric colorant, at least one catalyst, at least one surfactant, at least one flame retardant, water, and any mixtures thereof, into said collecting vessel through said feed line to form a resultant mixture of liquid polyol and said at least one liquid additive.

4. The method of claim 3 wherein said ball valve is a 3-way ball valve comprising at least one channel.

5. A method of controlled introduction of additives within a polyurethane slabstock foam producing system utilizing a liquid dosing assembly comprising a ball valve, a substantially cylindrical feed line, and a liquid collecting vessel, wherein said feed line simultaneously connects to said ball valve and feeds into said liquid collecting vessel, and wherein said feed line exhibits a liquid storage capacity of at most 30 mL, and exhibits a diameter of at most 0.42 inches (1.07 cm); said method comprising the steps of
(a) providing a liquid polyol within said collecting vessel;
(b) introducing at least one liquid additive from the group consisting of at least one dye, at least one pigment, at least one polymeric colorant, at least one catalyst, at least one surfactant, at least one flame retardant, water, and any mixtures thereof, into said collecting vessel through said feed line to form a resultant mixture of liquid polyol and said at least one liquid additive.

6. The method of claim 5 wherein said ball valve is a 3-way ball valve comprising at least one channel.

7. The method of claim 5 wherein said feed line exhibits a liquid storage capacity of at most 10 mL and exhibits a diameter of at most 0.33 inches.

8. The method of claim 7 wherein said feed line exhibits a liquid storage capacity of at most 4 mL and exhibits a diameter of at most 0.187 inches.

9. The method of claim 8 wherein said feed line exhibits a liquid storage capacity of at most 1 mL and exhibits a diameter of at most 0.078 inches.

* * * * *